US007311430B2

(12) United States Patent
Tsukamoto et al.

(10) Patent No.: US 7,311,430 B2
(45) Date of Patent: Dec. 25, 2007

(54) LAMP UNIT OF VEHICLE HEADLAMP

(75) Inventors: Michio Tsukamoto, Shizuoka (JP); Masahito Naganawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/546,275

(22) Filed: Oct. 12, 2006

(65) Prior Publication Data

US 2007/0086202 A1 Apr. 19, 2007

(30) Foreign Application Priority Data

Oct. 13, 2005 (JP) ......................... P. 2005-298414

(51) Int. Cl.
*B60Q 1/04* (2006.01)

(52) U.S. Cl. ...................... 362/545; 362/517; 362/521; 362/539

(58) Field of Classification Search ................ 362/298, 362/301, 302, 303, 304, 305, 335, 328, 517, 362/518, 521, 522, 538, 539, 543, 544, 545
See application file for complete search history.

(56) References Cited

U.S. PATENT DOCUMENTS 6,910,791 B2 * 6/2005 Futami ....................... 362/328
7,178,960 B2 * 2/2007 Ishida ........................ 362/545
2006/0120094 A1 * 6/2006 Tsukamoto et al. .......... 362/518
2006/0239021 A1 * 10/2006 Inaba ......................... 362/538

FOREIGN PATENT DOCUMENTS

JP 2003-317513 A 11/2003
JP 2005-044809 A 2/2005
JP 2005-108554 A 4/2005

* cited by examiner

*Primary Examiner*—Y. My Quach-Lee
(74) *Attorney, Agent, or Firm*—Sughrue Mion Pllc.

(57) ABSTRACT

A low beam light distribution pattern is formed by turning on a first light source unit and a high beam light distribution pattern is formed by additionally turning on a second light source unit. The second reflector of the second light source unit has reflecting faces of vertical cross-sectional shapes formed by two types of ellipses whose first focal point is on a center of emission of a second light-emitting element and whose second focal points are respectively positioned on points A, B. The additional lens whose rear focal points are on the second focal points A, B is arranged on a circumference of a projection lens. When the second light source unit is turned on, a high beam additional light distribution pattern is formed that vertically strides over the cutoff line of the low beam light distribution pattern.

8 Claims, 8 Drawing Sheets

LAMP UNIT OF VEHICLE HEADLAMP

This application claims foreign priority from Japanese Patent Application No. 2005-298414, filed on Oct. 13, 2005, the entire contents of which are hereby incorporated by reference.

BACKGROUND OF THE INVENTION

1. Field of the Invention

The present invention relates to a lamp unit of a vehicle headlamp, and in particular to a projector-type lamp unit that uses a light-emitting element such as a light-emitting diode as a light source.

2. Related Art

Recently, in vehicle headlamps, light-emitting elements such as light-emitting diodes become to be used as light sources.

For example, disclosed in JP-A-2003-317513 is a so-called projector-type lamp unit provided with a projection lens arranged on an optical axis extending in a front/rear direction of a vehicle, a light-emitting element arranged upward behind a rear focal point of the projection lens and in proximity to the optical axis, and a reflector for reflecting light from the light-emitting element in forward direction toward the optical axis.

Further, disclosed in JP-A-2005-044809 and JP-A-2005-108554 are projector-type lamp units where first and second light source units are arranged behind a projection lens.

In the lamp unit described in JP-A-2005-044809 and JP-A-2005-108554, the first light source unit includes a first light-emitting element arranged upward in proximity to an optical axis, a first reflector for reflecting light from the first light-emitting element in forward direction toward the optical axis, and a straight advancement interrupting member for interrupting part of the reflected light from the first reflector, the straight advancement interrupting member arranged so that its upper end edge passes near the rear focal point of the projection lens. The second light source unit includes a second light-emitting element arranged downward in proximity to the optical axis and a second reflector for reflecting light from the second light-emitting element in forward direction toward the optical axis.

When the first light source unit is turned on, a low beam light distribution pattern having a cutoff line at the upper end is formed. When the second light source unit is additionally turned on, a high beam additional light distribution pattern extending upward from a cutoff line is additionally formed to form a high beam light distribution pattern.

In the projector-type lamp unit described in JP-A-2005-044809, JP-A-2005-108554, it possible to switch between high beams and low beams by turning on/off the second light source unit.

However, a high beam additional light distribution pattern formed when the second light source unit is turned on is formed only above a cutoff line. This does not enhance the luminosity of the region near the cutoff line in the high beam light distribution pattern. As a result, the high beam light distribution pattern remains poor in terms of long-distance visibility.

SUMMARY OF THE INVENTION

One or more embodiments of the present invention provide a projector-type lamp unit of a vehicle headlamp that uses a light-emitting element as a light source in which the lamp unit is provided with first and second light source units arranged behind a projection lens, and a high beam light distribution pattern formed by the lamp unit is excellent in terms of long-distance visibility, by devising a configuration of the second light source unit and an additional projection lens.

In accordance with one or more embodiments of the present invention, a lamp unit of a vehicle headlamp is provided with: a projection lens arranged on an optical axis extending in a front/rear direction of a vehicle and first and second light source units arranged behind the projection lens, the first light source unit including: a first light-emitting element arranged to direct upward in proximity to the optical axis; a first reflector for reflecting light from the first light-emitting element in forward direction near the optical axis; and a straight advancement interrupting member having an upper end edge arranged to pass near a rear focal point of the projection lens for interrupting part of the reflected light from the first reflector, the second light source unit including: a second light-emitting element arranged to direct downward in proximity to the optical axis; and a second reflector having a reflecting face of a vertical cross-sectional shape formed by an ellipse including a first focal point in proximity to the second light-emitting element and a second focal point on a point between the second light-emitting element and the projection lens, the second reflector reflecting light from the second light-emitting element in forward direction near the major axis of the ellipse; and an additional projection lens arranged on the circumference of the projection lens, including an additional optical axis extending substantially in parallel with the optical axis, and having a rear focal point in proximity to the second focal point.

The "light-emitting element" of the first light-emitting element or second light-emitting element refers to an element-shaped light source having a light-emitting chip that emits light in a substantially point shape. The kind of such a light-emitting element is not particularly limited but a light-emitting diode or a laser diode may be employed.

While the first light-emitting element is arranged to direct upward, it is not necessarily that it is arranged perfectly vertically upward. While the second light-emitting element is arranged to direct downward, it is not necessarily that it is arranged perfectly vertically downward.

The second focal point of the ellipse constituting the vertical cross-sectional shape of the reflecting face of the second reflector is not in particular position as long as it is located between the second light-emitting element and the projection lens.

The configuration of the straight advancement interrupting member is not particularly limited as long as its upper end edge is arranged to pass near the rear focal point of the projection lens. For example, a light-shielding member designed to shield part of the reflected light from the first reflector to interrupt straight advancement of the reflected light, or a mirror member designed to reflect part of reflected light from the first reflector to interrupt straight advancement of the reflected light may be employed.

In accordance with one or more embodiments of the present invention, a lamp unit of a vehicle headlamp is provided with first and second light source units behind a projection lens arranged on an optical axis extending in a front/rear direction of a vehicle. The first light source unit includes a first light-emitting element arranged upward in proximity to the optical axis, a first reflector for reflecting light from the first light-emitting element in forward direction toward the optical axis, and a straight advancement interrupting member for interrupting a part of the reflected light from the first reflector, the straight advancement interrupting member arranged so that its upper end edge passes near the rear focal point of the projection lens. By turning on the first light source unit, it is possible to form a low beam light distribution pattern having a cutoff line at an upper end.

The second light source unit includes a second light-emitting element arranged downward in proximity to the optical axis and a second reflector having a reflecting face of a vertical cross-sectional shape formed by an ellipse including a first focal point in proximity to the second light-emitting element and a second focal point on a point between the second light-emitting element and the projection lens, the second reflector reflecting light from the second light-emitting element in forward direction toward a major axis of the ellipse. An additional projection lens including an additional optical axis extending substantially in parallel with the optical axis and a rear focal point in proximity to the second focal point is arranged on a circumference of the projection lens. Therefore, by additionally turning on the second light source unit, it is possible to form a high beam additional light distribution pattern on an upward portion of the low beam light distribution pattern, thereby forming a high beam light distribution pattern.

On that occasion, the light from the second light source unit is irradiated forward through the additional projection lens rather than the projection lens, the result being that the light is not shielded by a straight advancement interrupting member, unlike related art practices. Thus, a high beam additional light distribution pattern can be formed to vertically stride over the cutoff line of the low beam light distribution pattern. This enhances the luminosity of the region near the cutoff line in the high beam light distribution pattern, thereby providing a high beam light distribution pattern with excellent long-distance visibility.

In this way, according to the embodiments of the present invention, it is possible to provide a high beam light distribution pattern with excellent long-distance visibility formed by a projector-type lamp unit including first and second light source units behind a projection lens employed as a lamp unit of a vehicle headlamp that uses a light-emitting element as a light source.

Further, the second light-emitting element maybe arranged backward from the first light-emitting element. By this arrangement, light from the second light source unit may be more easily incident on an additional projection lens positioned on the circumference of the projection lens.

Further, the reflecting face of the second reflector may include a plurality of reflection regions of vertical cross-sectional shapes composed of ellipses having second focal points dislocated from each other. In addition, a plurality of lenses whose rear focal points are located in proximity to the second focal points of the ellipses constituting the vertical cross-sectional shapes of the reflection regions may constitute the additional projection lenses. This allows a plurality of light distribution patterns to be formed by way of light from the second light source unit that passes through these lenses and is irradiated in forward direction, thereby enhancing the freedom of setting the shape and luminosity distribution of a high beam light distribution pattern.

Further, the plurality of the reflection regions may be arranged so that the more apart from the second light-emitting element the reflection region is, the closer to the optical axis the second focal point of the ellipse constituting its vertical cross-sectional shape is located. This makes it possible to arrange the reflection regions and the lens parts of the additional projection lens in an optically reasonable layout.

Further, a lower lens part below the optical axis and an upper lens part above the optical axis may be used as the plurality of lens parts. This provides a compact lamp unit configured around the optical axis that can be easily incorporated into a vehicle headlamp.

In the above configuration, the straight advancement interrupting member may be a mirror member including an upward reflecting face extending substantially in parallel with the optical axis and extending rearward from the neighborhood of the rear focal point of the projection lens. This allows more amount of reflected light from the first reflector to be irradiated forward via a projection lens, thereby increasing the luminosity of the low beam light distribution pattern. In case an upper lens is used as part of the multiple lenses, the mirror member may include an aperture therein for transmitting part of the reflected light from the second reflector toward the upper lens so as to facilitate incidence of light on the upper lens.

Further, the additional projection lens may be an annular lens surrounding the projection lens. This provides a more compact lamp unit configured around the optical axis that can be more easily incorporated into a vehicle headlamp.

Other aspects and advantages of the invention will be apparent from the following description and the appended claims.

DETAILED DESCRIPTION OF THE EXEMPLARY EMBODIMENTS

Exemplary embodiments of the invention will be described with reference to the accompanying drawings.

Figure 1:
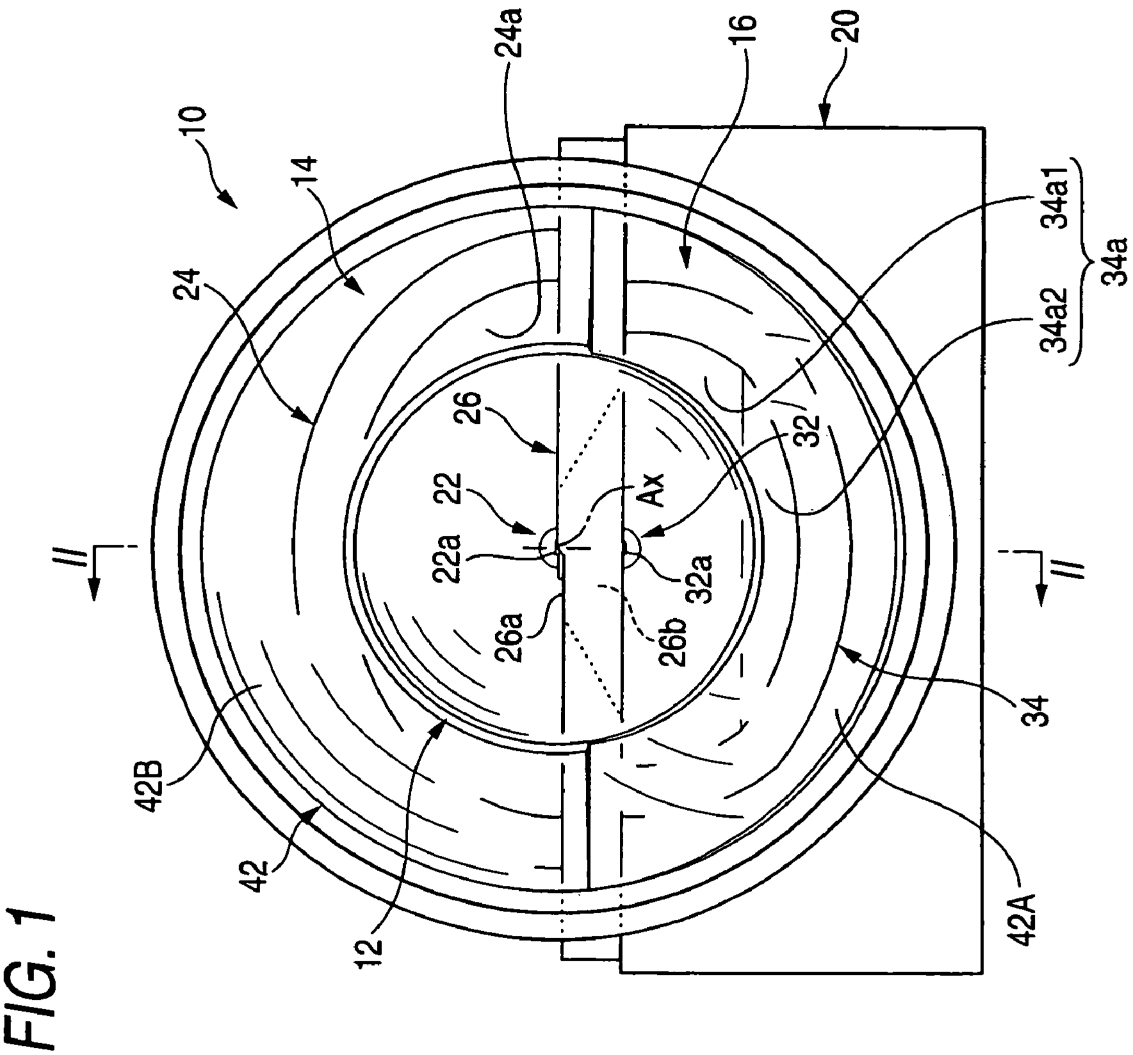
FIG. 1 is a front view of a lamp unit according to an exemplary embodiment of the invention.
Figure 2:
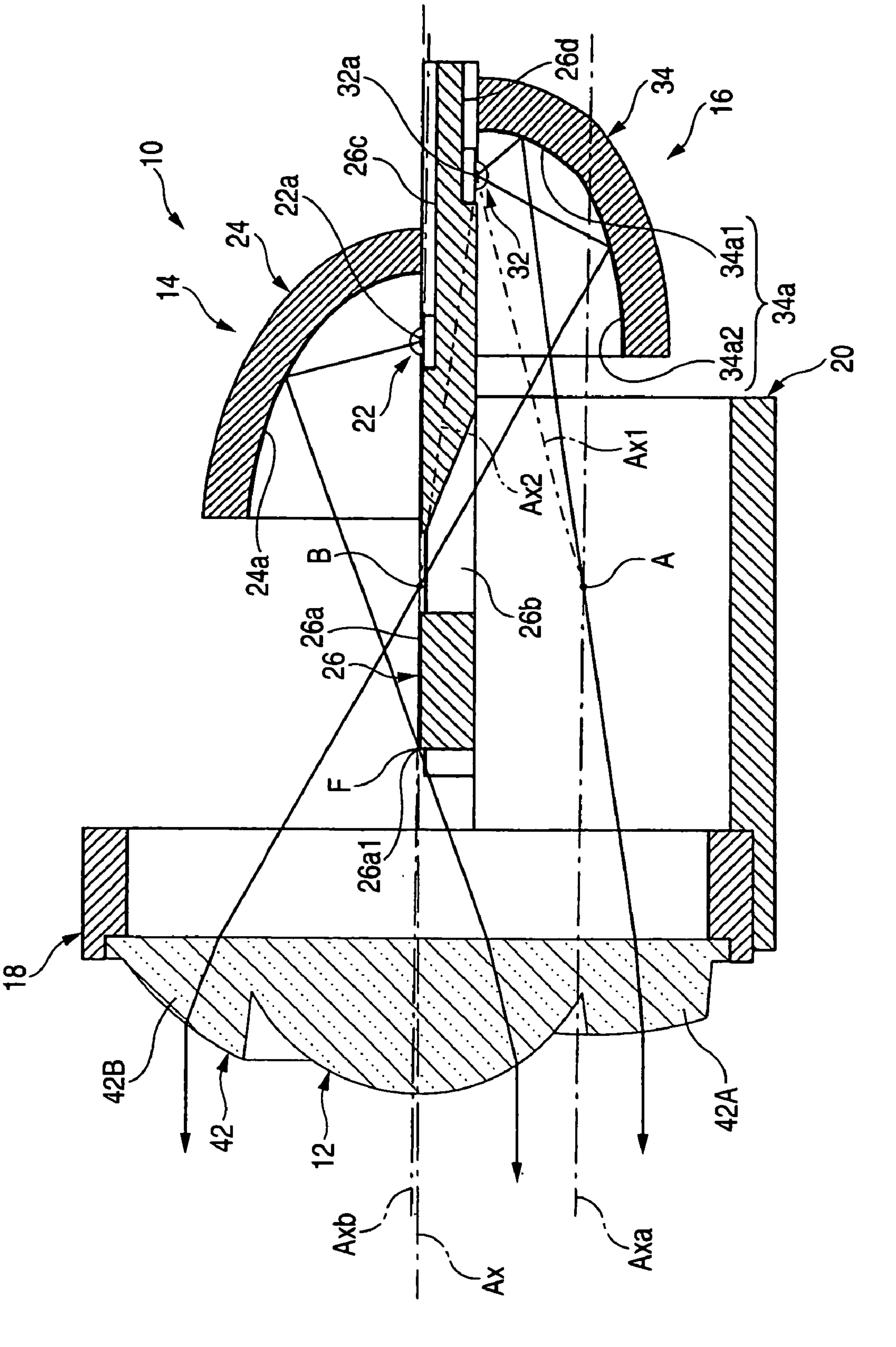
FIG. 2 is a cross-sectional view taken along the line II-II in FIG. 1.
Figure 3:
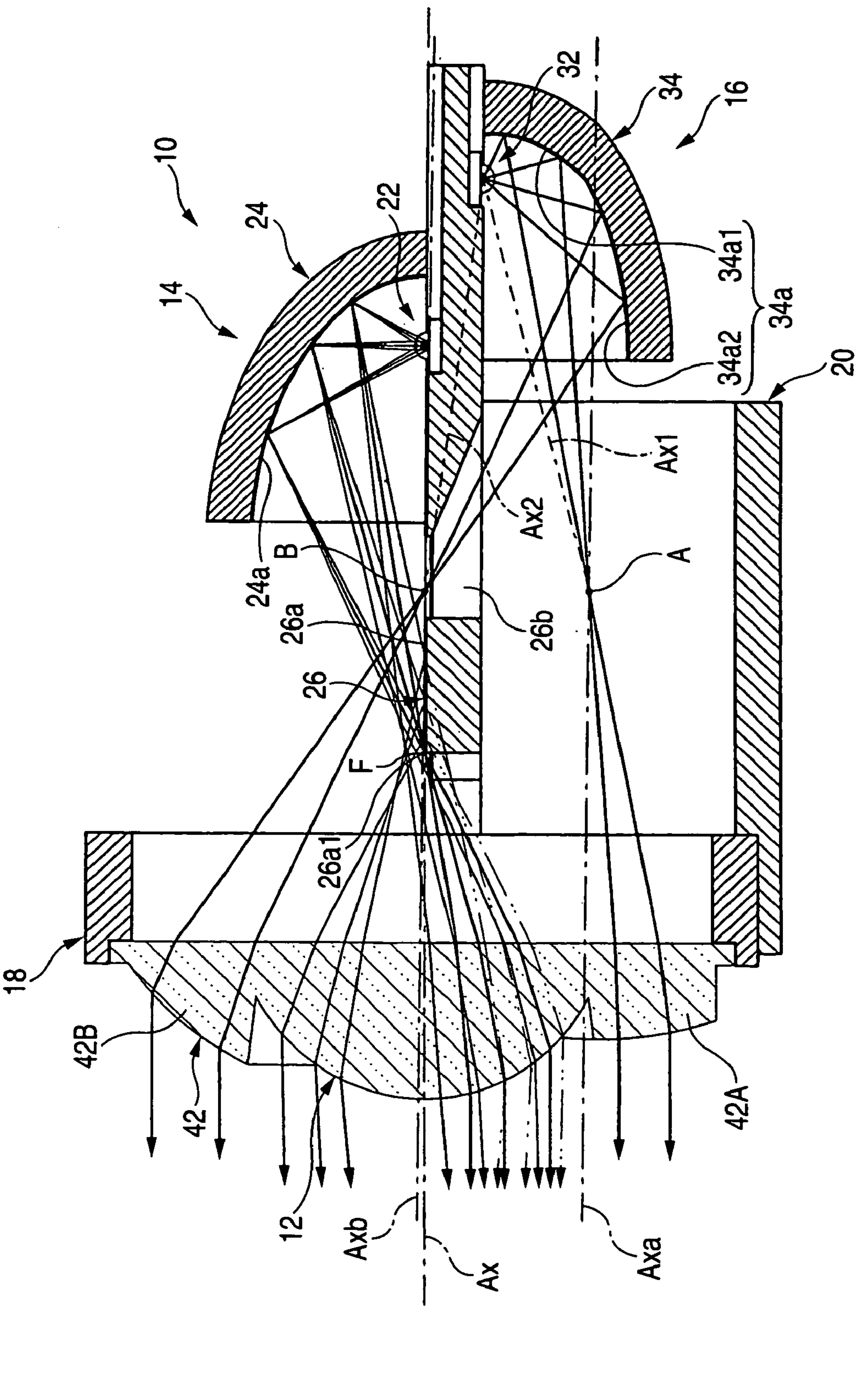
FIG. 3 is a drawing showing an optical path in the lamp unit in details.

FIG. 1 is a front view of a lamp unit 10 according to an exemplary embodiment of the invention. FIG. 2 is a cross-sectional view taken along the line II-II in FIG. 1. FIG. 3 is a drawing similar to FIG. 2 showing the optical path in the lamp unit 10 in details.

As shown in the figures, the lamp unit 10 according to the exemplary embodiment is a lamp unit that is used while incorporated into a vehicle headlamp as part thereof. The lamp unit 10 is provided with a projection lens 12 arranged on an optical axis Ax extending in a front/rear direction of a vehicle, a first light source unit 14 and a second light source unit 16 arranged behind the projection lens 12, and an additional projection lens 42. The lamp unit 10 is arranged so that its optical axis Ax will extend in a direction 0.5 to 0.6 degrees downward with respect to the front/rear direction of a vehicle while incorporated into a vehicle headlamp.

The projection lens 12 is composed of a plain-convex a spherical lens having a front convex surface and a plain rear surface. The projection lens 12 is designed to project a light source image formed on its rear focal point plane (that is, a focal point plane including the rear focal point F of the projection lens 12) onto a virtual vertical screen ahead of the lamp as a reversed image. The projection lens 12 is fixed to a ring-shaped lens holder 18, which is fixed to a base member 20.

The first light source unit 14 includes a first light-emitting element 22 arranged upward behind the rear focal point F of the projection lens 12, a first reflector 24 arranged to cover the first light-emitting element 22 from the upper side, the first reflector reflecting light from the first light-emitting element 22 in forward direction near the optical axis Ax, and a mirror member 26 arranged between the first reflector 24 and the projection lens 12, the mirror member serving as a straight advancement interrupting member for interrupting part of the reflected light from the first reflector 24 by reflecting part of the reflected light upward.

The first light-emitting element 22 is a white light-emitting diode having a 0.3 to 3 mm square light-emitting chip 22*a*. The first light-emitting element 22 is positioned and fixed to a light source support recessed part 26*c* formed on the top face of the mirror member 26 with the light-emitting chip 22*a* oriented upward in vertical direction on the optical axis Ax.

The reflecting face 24*a* of the first reflector 24 is composed of a substantially elliptical curved face having a major axis coaxial with the optical axis Ax and a first focal point being the center of emission of the first light-emitting element 22 and its eccentricity gradually increases from the vertical cross section toward the horizontal cross section. The reflecting face 24*a* causes light from the first light-emitting element 22 to converge to the rear focal point F of the projection lens 12 in the vertical cross section while brings the convergence point considerably forward in the horizontal cross section. The first reflector 24 is fixed to the upper face of the mirror member 26 at the lower end of the circumference of the reflecting face 24*a*.

The mirror member 26 is formed into a substantially flat plate and supported by the upper end of a base member 20 on the left and right sides.

The mirror member 26 has an upward reflecting surface 26*a* extending rearward along the optical axis Ax from the rear focal point F. The mirror member 26 reflects in upward direction, on the upward reflecting surface 26*a*, part of the reflected light directed to the projection lens 12 from the reflecting face 24*a* of the first reflector 24 to make the upward reflected light incident on the projection lens 12 and cause the reflected light to outgo from the projection lens 12 as downward light.

The upward reflecting surface 26*a* of the mirror member 26 is formed on the upper face of the mirror member 26 by way of mirror finish using aluminum evaporation. The upward reflecting surface 26*a* has a left region positioned on the left side (right side in the front view of the lamp) of the optical axis Ax composed of a horizontal face including the optical axis Ax and a right hand region positioned on the right side of the optical axis Ax composed of a horizontal face lower than the left region with a stepped difference through a short inclined surface. The front end edge 26*a*1 of the upward reflecting surface 26*a* is formed to extend along the rear focal point plane of the projection lens 12.

The mirror member 26 has an aperture 26*b* formed therein that penetrates the mirror member 26 in vertical direction on the optical axis Ax. The aperture 26*b* is formed in a position apart rearward to some extent from the front end edge 26*a*1 of the upward reflecting surface 26*a* (to be more specific, nearly the center position between the front end edge 26*a*1 and the first light-emitting element 22), so that the rear wall and left and right walls of the aperture 26*b* will expand downward.

The second light source unit 16 includes a second light-emitting element 32 arranged downward behind the first light-emitting element 22 and a second reflector 34 arranged to cover the second light-emitting element 32 from the lower side, the second reflector reflecting light from the second light-emitting element 32 in forward direction.

The second light-emitting element 32 is a white light-emitting diode having a 0.3 to 3 mm square light-emitting chip 32*a*. The second light-emitting element 32 is positioned and fixed to a light source support recessed part 26*d* formed on the bottom face of the mirror member 26 with the light-emitting chip 32*a* oriented downward in vertical direction in the neighborhood below the optical axis Ax.

The second reflector 34 has a reflecting face 34*a* composed of two reflection regions 34*a*1, 34*a*2 and is fixed to the bottom face of the mirror member 26 at its upper end of the circumference of the reflection regions.

The reflection regions 34*a*1, 34*a*2 have vertical cross-sectional shapes formed by ellipses whose first focal point is on the center of emission of the second light-emitting element 32 and whose second focal points are on respectively predetermined points A, B between the second light-emitting element and the projection lens 12, in order to reflect light from the second light-emitting element 32 in forward direction near the major axes of the ellipses Ax1, Ax2.

In the reflection region 34*a*1 positioned above, the second focal point A of the ellipse constituting the vertical cross-sectional shape is set in a point below the optical axis Ax to some extent and the major axis Ax1 of the ellipse extends obliquely downward in forward direction. The reflection region 34*a*1 is composed of a substantially elliptical curved face about the major axis Ax1 and its eccentricity gradually increases from the vertical cross section toward the horizontal cross section. The reflection region 34*a*1 causes light from the second light-emitting element 32 to converge to the second focal point A in the vertical cross section while brings the convergence point somewhat forward in the horizontal cross section.

In the reflection region 34*a*2 positioned below, the second focal point B of the ellipse constituting the vertical cross-sectional shape is set in a point behind the rear focal point F of the projection lens 12 on the optical axis Ax to some extent and the major axis Ax2 of the ellipse extends obliquely upward in forward direction. The reflection region 34*a*2 is composed of a substantially elliptical curved face about the major axis Ax2 and its eccentricity gradually increases from the vertical cross section toward the horizontal cross section. The reflection region 34*a*2 causes light from the second light-emitting element 32 to converge to the second focal point B in the vertical cross section while brings the convergence point somewhat forward in the horizontal cross section. The upper end edge of the aperture 26*b* of the mirror member 26 is open so as to surround the second focal point B. This transmits reflected light from the reflection area 34*a*2 toward the space above the mirror member 26 without shielding the reflected light.

The additional projection lens 42 is arranged on the circumference of the projection lens 12. The additional projection lens 42 is configured as an annular lens integral with the projection lens 12 while surrounding the projection lens 12. The additional projection lens 42 is composed of a lower lens part 42A positioned below the optical axis Ax and an upper lens part 42B positioned above the optical axis Ax.

The lower lens part 42A is composed of a plain-convex lens having an additional optical axis AXa passing through the second focal point A and extending forward in a direction inclined upward by some 0.5 to 0.6 degrees with respect to the optical axis Ax. The lower lens part 42A has its rear face formed by a plane flush with the rear face of the projection lens 12 and the curvature of its front curved face is specified so that the rear focal point of the lower lens part 42A will be positioned in the second focal point A.

The upper lens part 42B is composed of a plain-convex lens having an additional optical axis AXb passing through the second focal point B and extending forward in a direction inclined upward by some 0.5 to 0.6 degrees with respect to the optical axis Ax. The upper lens part 42B has its rear face formed by a plane flush with the rear face of the projection lens 12 and the curvature of its front curved face is specified so that the rear focal point of the upper lens part 42B will be positioned in the second focal point B.

Figure 4:
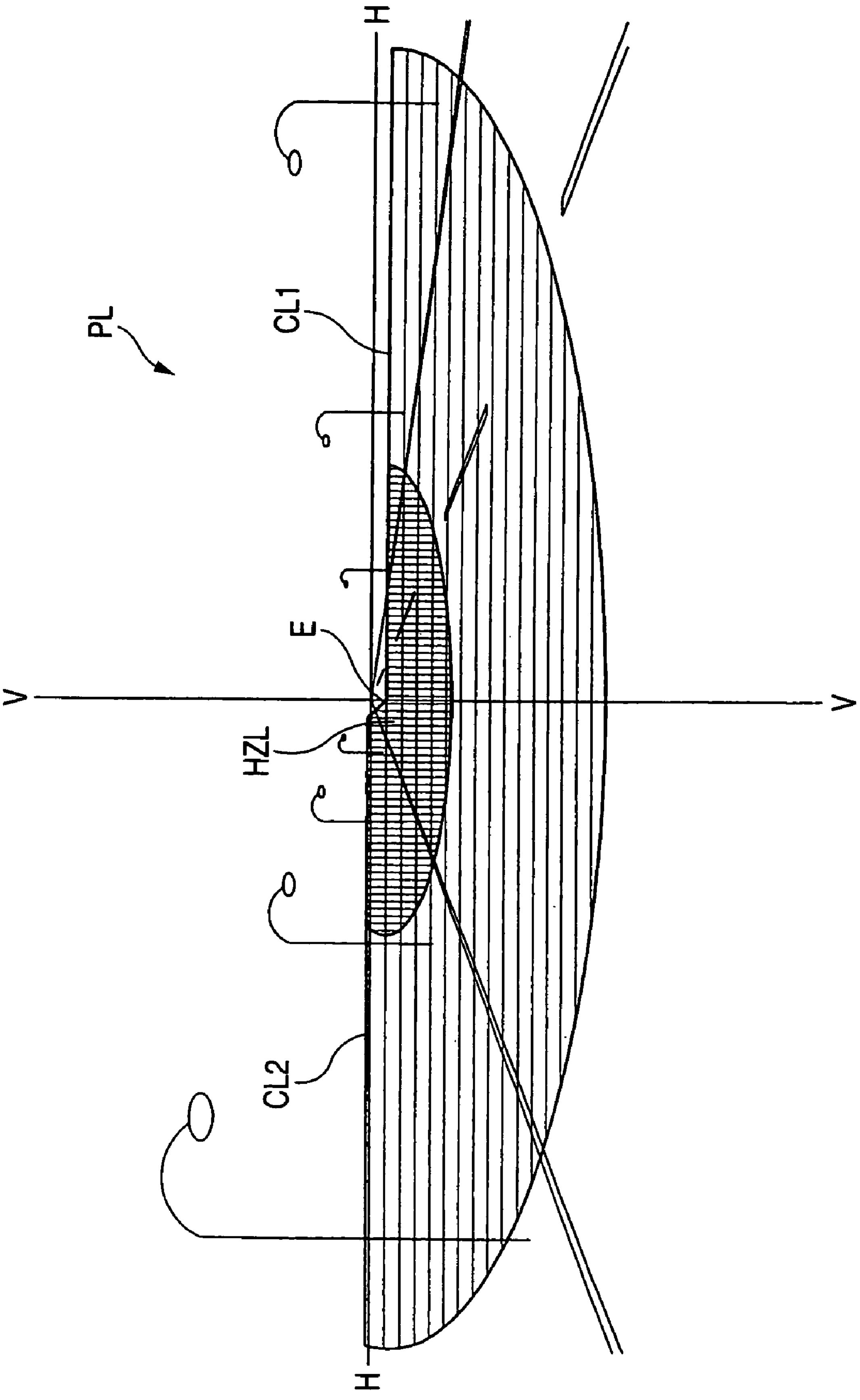
FIG. 4 is a perspective view of a low beam light distribution pattern formed on a virtual vertical screen arranged in a position 25 meters ahead of a vehicle by the light irradiated forward from the lamp unit.

FIG. 4 is a perspective view of a low beam light distribution pattern PL formed on a virtual vertical screen arranged in a position 25 meters ahead of a vehicle by the light irradiated forward from the lamp unit 10 according to this exemplary embodiment.

The low beam light distribution pattern PL is a left low beam light distribution pattern formed by turning on the first light source unit 14 and has cutoff lines CL1, CL2 with a stepped difference at its upper end edge. The cutoff lines CL1, CL2 extends in horizontal direction with a stepped difference between the left and right sides of the line V-V that vertically passes through H-V as a vanishing point in the front direction of the lamp unit. The oncoming vehicle lane part on the right side of the line V-V is formed as a lower cutoff line CL1 while the present vehicle lane part on the left side of the line V-V is formed as an upper cutoff line CL2 stepped up from the lower cutoff line CL1 via an inclined part.

The low beam light distribution pattern PL is formed by projecting on the virtual vertical screen the image of the first light-emitting element 22 formed on the rear focal point plane of the projection lens 12 by the light from the first light-emitting element 22 reflected on the first reflector 24, as a reversed projection image by way of the projection lens 12. The cutoff lines CL1, C12 of the low beam light distribution pattern PL are formed as the reversed projection image of the front end edge **26*a*1 of the upward reflecting face 26*a* of the mirror member 26**.

In the low beam light distribution pattern PL, an elbow point E as an intersection of the lower cutoff line CL1 and the line V-V is positioned some 0.5 to 0.6 degrees below H-V. This is because the optical axis Ax extends in a direction downward by some 0.5 to 0.6 degrees with respect to the front/rear direction of a vehicle. In the low beam light distribution pattern PL, a hot zone HZL as a high-luminosity region is formed while surrounding the elbow point E.

Figure 5:
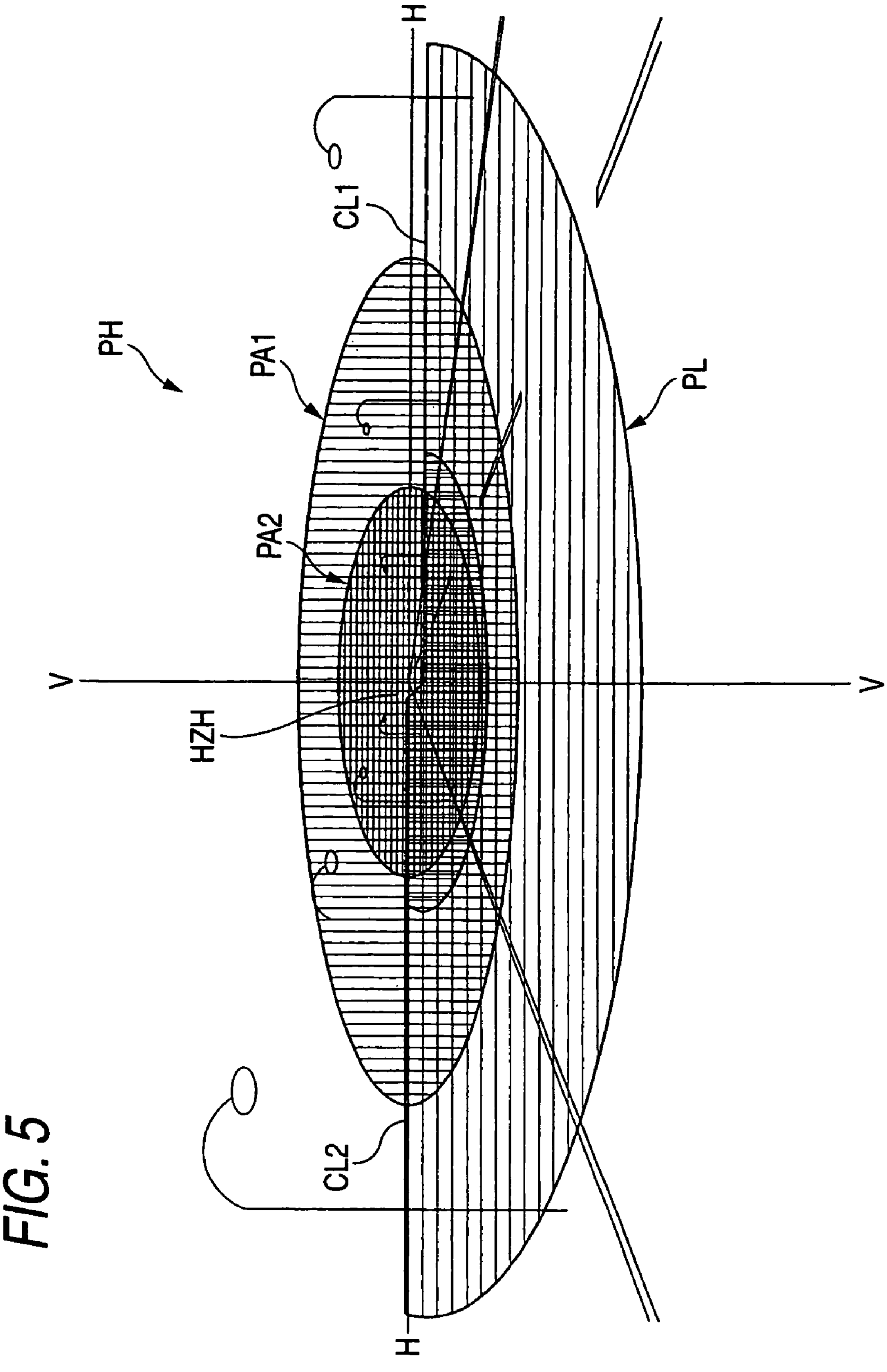
FIG. 5 is a perspective view of a high beam light distribution pattern formed on the virtual vertical screen by the light irradiated forward from the lamp unit.

FIG. 5 is a perspective view of a high beam light distribution pattern PH formed on the virtual vertical screen by the light irradiated forward from the lamp unit 10 according to this exemplary embodiment.

The high beam light distribution pattern PH is a light distribution pattern formed by simultaneously turning on the first and second light source units 14, 16. The high beam light distribution pattern PH is formed as a synthetic light distribution pattern of the low beam light distribution pattern PL and the high beam additional light distribution patterns PA1, PA2 and its hot zone HZH is positioned in proximity to H-V.

The high beam additional light distribution pattern PA1 is a light distribution pattern formed by the reflected light from the reflection region **34*a*1 of the second light source unit 16. The high beam additional light distribution pattern PA1 is a landscape light distribution pattern about H-V and is formed to vertically stride over the cutoff lines CL1, CL2** of the low beam light distribution pattern PL and has a horizontal dispersion angle somewhat smaller than that of the low beam light distribution pattern PL.

The high beam additional light distribution pattern PA2 is a light distribution pattern formed by the reflected light from the reflection region **34*a*2 of the second light source unit 16. The high beam additional light distribution pattern PA2 is a landscape light distribution pattern about H-V that is smaller and brighter than the high beam additional light distribution pattern PA1 and is formed to vertically stride over the cutoff lines CL1, CL2** of the low beam light distribution pattern PL.

The high beam additional light distribution patterns PA1, PA2 are formed as light distribution patterns about H-V because the additional optical axes Axa, Axb of the lower lens part 42A and the upper lens part 42B constituting the additional projection lens 42 extend forward in a direction inclined upward by some 0.5 to 0.6 degrees with respect to the optical axis Ax.

As detailed above, the lamp unit of a vehicle headlamp 10 according to this exemplary embodiment includes first and second light source units 16 arranged behind a projection lens 12 arranged on an optical axis Ax extending in the front/rear direction of a vehicle. Its first light source unit 14 includes a first light-emitting element 22 arranged upward on the optical axis Ax, a first reflector 24 for reflecting light from the first light-emitting element 22 in forward direction near the optical axis Ax, and a mirror member 26 arranged so that the front end edge **26*a*1 (serving the feature as the upper end edge of a straight advancement interrupting member in this embodiment) of an upward reflecting face 26*a* passes near the rear focal point F of the projection lens 12, the mirror member serving as a straight advancement interrupting member for interrupting part of the reflected light from the first reflector 24. By turning on the first light source unit 14, it is possible to form a low beam light distribution pattern PL having cutoff lines CL1, CL2** at its upper end.

The second light source unit 16 includes a second light-emitting element 32 arranged downward in proximity to and below an optical axis and a second reflector 34 having a reflecting face **34*a* composed of reflecting regions 34*a*1, 34*a*2 of a vertical cross-sectional shape formed by two types of ellipses including the center of emission of the second light-emitting element 32 as a first focal point and predetermined points A, B between the second light-emitting element 32 and the projection lens 12 as respectively second focal points, the second reflector reflecting light from the second light-emitting element 32 in forward direction near the major axes Ax1, Ax2 of the ellipses. On the circumference of the projection lens 12 is arranged an additional projection lens 42 composed of a lower lens part 42A and an upper lens part 42B including additional optical axes Axa, Axb extending substantially in parallel with the optical axis Ax and whose rear focal points are respectively the second focal points A, B. By additionally turning on the second light source unit 16, it is possible to form high beam additional light distribution patterns PA1, PA2** on top of the low beam additional light distribution pattern PL, thereby forming a high beam light distribution pattern PH.

On that occasion, the light from the second light source unit 16 is irradiated forward through the additional projection lens 42 rather than the projection lens 12, the result being that the light is not shielded by a straight advancement interrupting member, unlike related art practices. Thus, high beam additional light distribution patterns PA1, PA2 can be formed to vertically stride over the cutoff lines CL1, CL2 of the low beam light distribution pattern PL. This enhances the luminosity of the region near the cutoff lines CL1, CL2 in the high beam light distribution pattern PH, thereby providing a high beam light distribution pattern PH with excellent long-distance visibility.

In this way, according to this exemplary embodiment, it is possible to provide a high beam light distribution pattern PH with excellent long-distance visibility formed by a projector-type lamp unit 10 including first and second light source units 14, 16 behind a projection lens 12 employed as a lamp unit of a vehicle headlamp that uses a light-emitting element as a light source.

The reflecting face 34*a* of the second reflector 34 in the second light source unit 16 is composed of two reflection regions 34*a*1, 34*a*2 where the positions of the second focal points A, B of ellipses constituting the vertical cross-sectional shape of the reflecting face are different from each other. The additional projection lens 42 is composed of a lower lens part 42A and upper lens part 42B whose rear focal points are respectively the second focal points A, B. It is thus possible to form a relatively large high beam additional light distribution pattern PA1 and a relatively small and bright high beam additional light distribution pattern PA2 by way of the light from the second light source unit 16 that passes through the lens parts 42A, 42B and is irradiated forward, thereby providing a smooth luminosity distribution of the high beam additional light distribution patterns PA1, PA2 and enhancing the visibility of the high beam light distribution pattern PH.

In the two reflection regions 34*a*1, 34*a*2 constituting the reflecting face 34*a* of the second reflector 34, the second focal point A of an ellipse constituting the vertical cross-sectional shape of the reflection region 34*a*1 positioned in proximity to the second light-emitting element 32 is located below the optical axis Ax. The second focal point B of an ellipse constituting the vertical cross-sectional shape of the reflection region 34*a*2 apart from the second light-emitting element 32 is located on the optical axis Ax. This makes it possible to arrange the reflection regions 34*a*1, 34*a*2 and the lens parts 42A, 42B of the additional projection lens 42 in an optically reasonable layout.

In this example, the additional projection lens 42 is composed of a lower lens part 42A below the optical axis Ax and an upper lens part 42B above the optical axis Ax. This provides a compact lamp unit 10 configured around the optical axis Ax that can be easily incorporated into a vehicle headlamp.

Particularly, in this exemplary embodiment, the additional projection lens 42 is an annular lens surrounding the projection lens 12. This provides a more compact lamp unit 10 configured around the optical axis Ax that can be more easily incorporated into a vehicle headlamp.

In this exemplary embodiment, a straight advancement interrupting member for interrupting straight advancement of part of the reflected light from the first reflector 24 is provided as a mirror member 26 including an upward reflecting face 26*a* extending rearward from the rear focal point F of the projection lens 12 in parallel with the optical axis Ax. This allows more amount of reflected light from the first reflector 24 to be irradiated forward via a projection lens 12, thereby increasing the luminosity of the low beam light distribution pattern PL.

The mirror member 26 has an aperture 26*b* formed therein for transmitting reflected light from the reflection region 34*a*2 of the second reflector 34 toward the upper lens part 42B, thus facilitating the incidence of light on the upper lens part 42B. The mirror member 26 is formed so that the rear wall and left and right walls of the mirror member 26 will expand downward. It is thus possible to make the reflected light from the reflection region 34*a*2 incident on the upper lens part 42B while hardly shielding the reflected light. Further, the mirror member 26 is formed apart rearward to some extent from the front end edge 26*a*1 of the upward reflecting face 26*a*, so that the upward reflection of the reflected light from the first reflector 24 by way of the upward reflecting face 26*a* is hardly interrupted.

In this exemplary embodiment, the second light-emitting element 32 is arranged behind the first light-emitting element 22. It is thus made easy to make light from the second light source unit 16 incident on the additional projection lens 42 positioned on the circumference of the projection lens 12.

While the reflecting face 34*a* of the second reflector 34 is composed of two reflection regions 34*a*1, 34*a*2 in this exemplary embodiment, the reflecting face 34*a* may be composed of a single reflecting face or three or more reflecting regions.

While the additional projection lens 42 is integral with the projection lens 12 in this exemplary embodiment, the additional projection lens 42 may be separately formed from the projection lens 12.

While the first light-emitting element 22 is arranged on the optical axis Ax in this exemplary embodiment, the first light-emitting element may be arranged off the optical axis Ax to some extent.

Variations of the above exemplary embodiment will be described.

A first variation of the above exemplary embodiment will be described.

Figure 6:
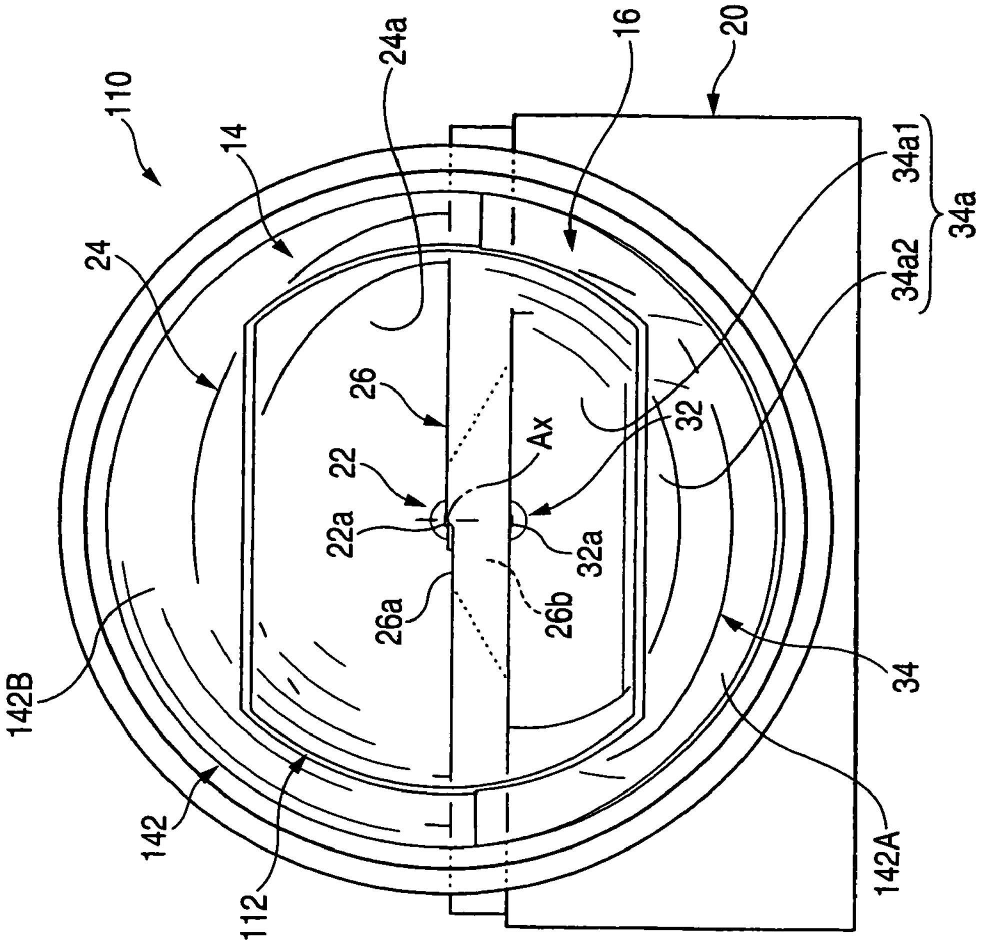
FIG. 6 is a drawing showing a lamp unit according to a first variation of the exemplary embodiment.

FIG. 6 is a drawing similar to FIG. 1 showing a lamp unit 110 according to this variation.

As shown in FIG. 6, while configuration of the first and second light source units 14, 16 of the lamp unit 110 is substantially the same as that of the above exemplary embodiment, configuration of the projection lens 112 and additional projection lens 142 is different from that of the above embodiment.

To be more specific, the projection lens 112 according to this variation is formed in a landscape oval shape of a slightly larger size than the projection lens 12 of the above exemplary embodiment. The additional projection lens 142 of this variation is composed of the lower lens part 142A and the upper lens part 142B, substantially the same as the additional projection lens 42 of the above exemplary embodiment. Parts positioned on the left and right sides of the projection lens 112 are narrower than those of the additional projection lens 42 of the above exemplary embodiment because of the projection lens 112 projecting leftward and rightward.

With the configuration of the variation, it is possible to provide the aperture diameter of the projection lens 112 larger than that of the projection lens 12 of the above exemplary embodiment, thereby accurately controlling of incident light from the first light source unit 14.

On the lower lens part 142A of the additional projection lens 142, reflected light from the reflection region 34*a*1 of the second reflector 34 is incident on a region substantially just beneath the optical axis Ax. On the upper lens part 142B of the additional projection lens 142, reflected light from the reflection region 34*a*2 of the second reflector 34 is incident on a region substantially just above the optical axis Ax. In this variation, it is possible to form the high beam additional light distribution patterns PA1, PA2 without trouble even when narrow parts of the lenses 142A, 142B are positioned on the left and right sides of the projection lens 112.

A second variation of the above exemplary embodiment will be described.

Figure 7:
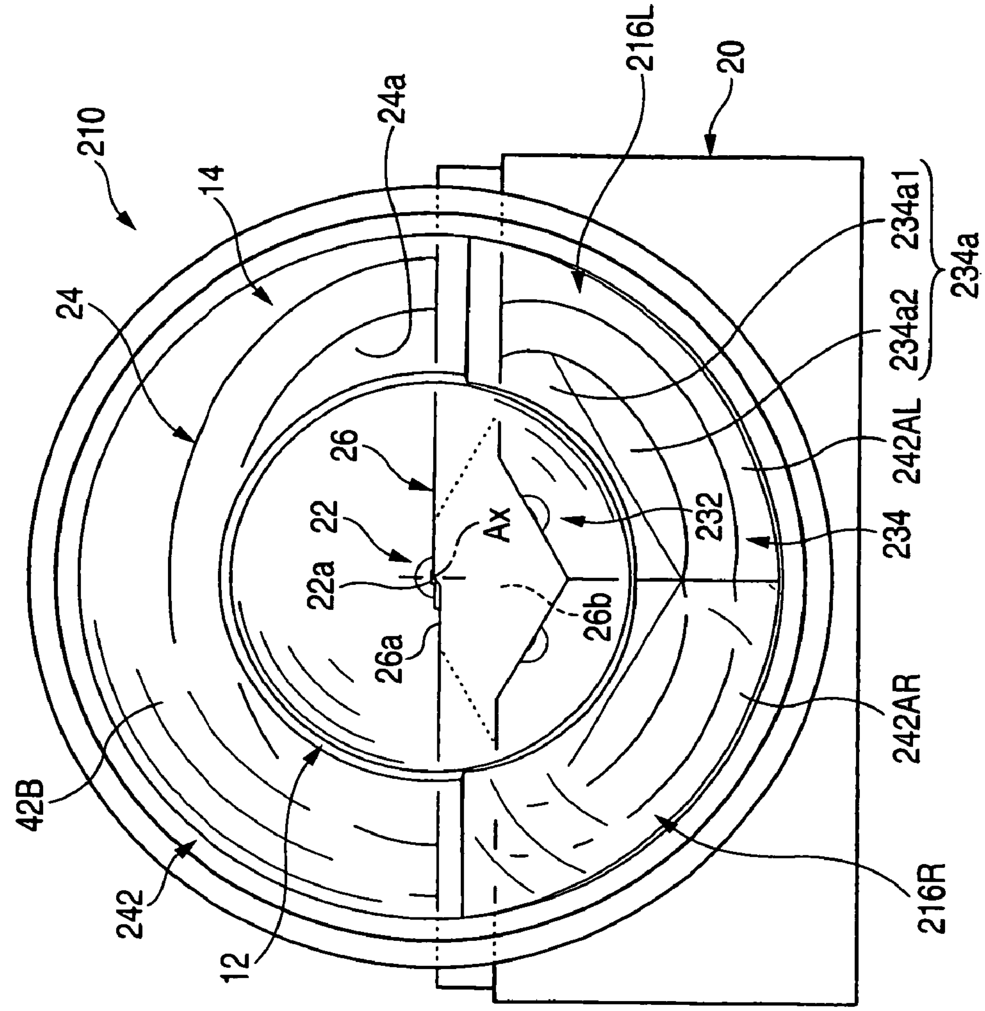
FIG. 7 is a drawing showing a lamp unit according to a second variation of the exemplary embodiment.

FIG. 7 is a drawing similar to FIG. 1 showing a lamp unit 210 according to the second variation.

As shown in FIG. 7, while configuration of the projection lens 12 and the first light source unit 14 of the lamp unit 210 is substantially the same as that of the above exemplary embodiment, configuration of the second light source units 216L, 216R and the lower lens parts 242AL, 242AR of the additional projection lens 242 is different from that of the above exemplary embodiment.

According to this variation, a pair of second light source units 216L, 216R symmetrically arranged in horizontal direction are provided obliquely downward instead of the second light source unit 16 according to the above exemplary embodiment. Configuration of the second light source units 216L, 216R is substantially the same as that of the second light source unit 16 of the above exemplary embodiment and is designed to reflect light from the second light-emitting element 232 on the two reflection regions 234*a*1, 234*a*2 constituting the reflecting face 234*a* of the second reflector 234.

The additional projection lens 242 of this variation is composed of a pair of lower lens parts 242AL, 242AR symmetrically arranged with respect to the optical axis Ax instead of the lower lens part 42A of the additional projection lens 42 of the above exemplary embodiment. Configuration of the lower lens parts 242AL, 242AR is substantially the same as that of the lower lens part 42A of the above exemplary embodiment and is designed to transmit light from the second light source units 216L, 216R.

Figure 8:
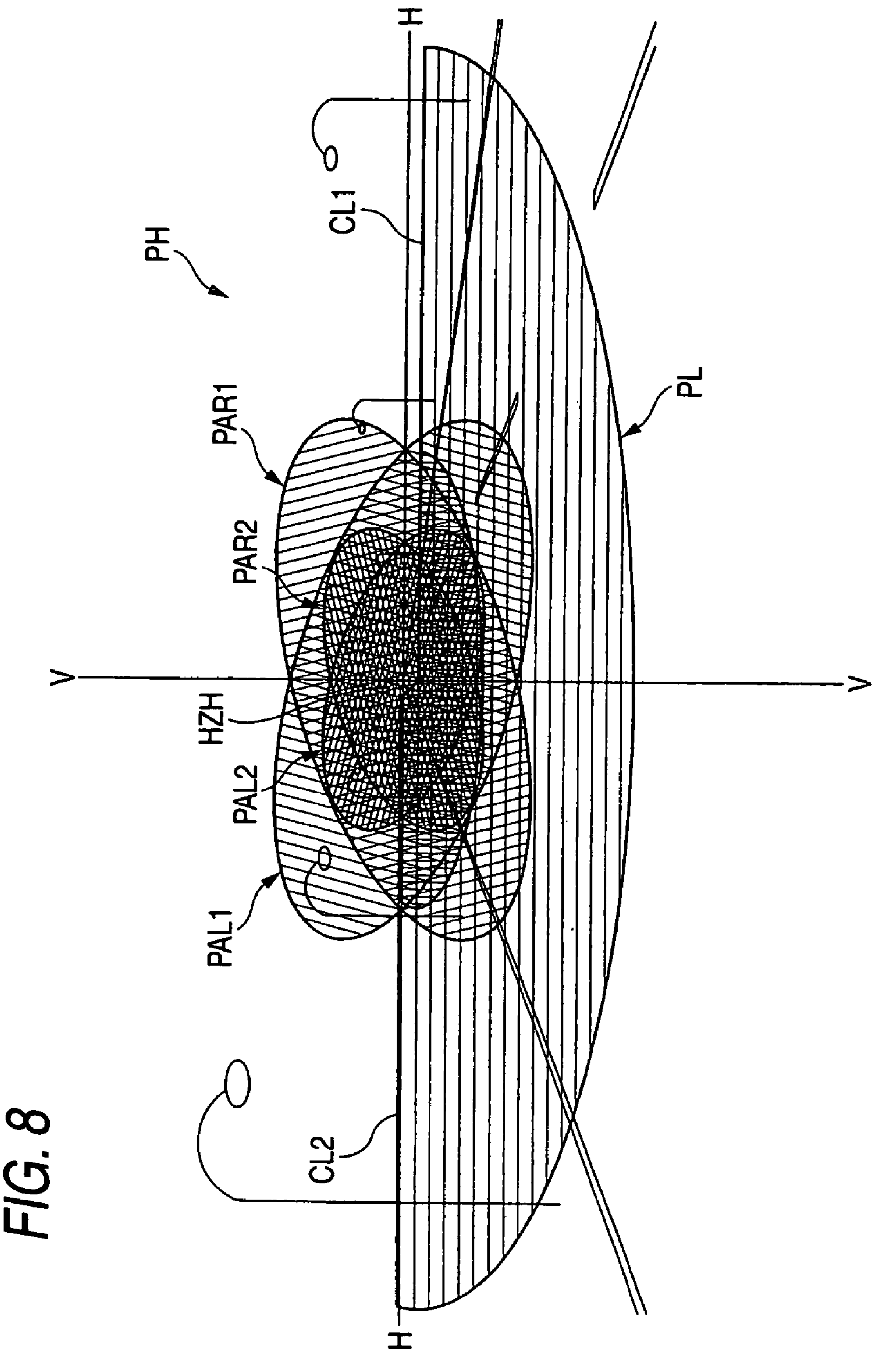
FIG. 8 is a perspective view of a high beam light distribution pattern formed on the virtual vertical screen by the light irradiated forward from the lamp unit according to the second variation of the exemplary embodiment.

FIG. 8 is a perspective view of a high beam light distribution pattern PH formed on the virtual vertical screen by the light irradiated forward from the lamp unit 210 according to this variation.

The high beam light distribution pattern PH is a light distribution pattern formed by simultaneously turning on the first light source unit 14 and the second light source units 216L, 216R. The high beam light distribution pattern PH is formed as a synthetic light distribution pattern of the low beam light distribution pattern PL and the high beam additional light distribution patterns PAL1, PAL2, PAR1, PAR2 and its hot zone HZH is positioned in proximity to H-V.

The high beam additional light distribution pattern PAL1 is a light distribution pattern formed by reflected light from the reflection region 234*a*1 of the second light source unit 216L. The high beam additional light distribution pattern PAL1 is an obliquely landscape light distribution pattern inclined upward in leftward direction about H-V and has a considerably smaller horizontal dispersion angle than the low beam light distribution pattern PL.

The high beam additional light distribution pattern PAL2 is a light distribution pattern formed by reflected light from the reflection region 234*a*2 of the second light source unit 216L. The high beam additional light distribution pattern PAL2 is an obliquely landscape light distribution pattern inclined upward in leftward direction about H-V and is a smaller and brighter light distribution pattern than the high beam additional light distribution pattern PAL1.

These high beam additional light distribution patterns PAL1, PAL 2 are formed to vertically stride over the cutoff lines CL1, CL2 of the low beam light distribution pattern PL.

The high beam additional light distribution pattern PAR1 is a light distribution pattern formed by reflected light from the reflection region 234*a*1 of the second light source unit 216R. The high beam additional light distribution pattern PAR2 is a light distribution pattern formed by reflected light from the reflection region 234*a*2 of the second light source unit 216R.

The high beam additional light distribution patterns PAR1, PAR2 are formed as light distribution patterns laterally symmetrical to the high beam additional light distribution patterns PAL1, PAL2 with respect to the line V-V.

By employing the configuration of this variation, it is possible to increase the luminosity of the high beam additional light distribution patterns PAL1, PAL 2, PAR1, PAR2 to a greater level than that of the high beam additional light distribution patterns PA1, PA2 of the above exemplary embodiment. This provides a high beam light distribution pattern PH with improved long-distance visibility.

While the invention has been described with reference to the exemplary embodiment and variations thereof, the technical scope of the invention is not restricted to the description of the exemplary embodiment and variations thereof. It is apparent to the skilled in the art that various changes or improvements can be made. It is apparent from the description of claims that the changed or improved configurations can also be included in the technical scope of the invention.

What is claimed is:

1. A lamp unit of a vehicle headlamp comprising:

a projection lens arranged on an optical axis extending in a front/rear direction of a vehicle;

a first light source unit arranged behind the projection lens and including a first light-emitting element arranged upward, a first reflector for reflecting light from the first light-emitting element in forward direction, and a straight advancement interrupting member, having an upper end edge arranged to pass near a rear focal point of the projection lens, for interrupting a part of the reflected light from the first reflector;

a second light source unit arranged behind the projection lens and including a second light-emitting element arranged downward, and a second reflector for reflecting light from the second light-emitting element in forward direction, the second reflector including a reflecting face of a vertical cross-sectional shape formed by an ellipse having a first focal point in proximity to the second light-emitting element and a second focal point on a point between the second light-emitting element and the projection lens; and an additional projection lens arranged on a circumference of the projection lens and having an additional optical axis extending substantially in parallel with the optical axis and a rear focal point in proximity to the second focal point.

2. The lamp unit according to claim 1, wherein the first light-emitting element is arranged in proximity to the optical axis, the first reflector reflects the light from the first light-emitting element toward the optical axis, the second light-emitting element is arranged in proximity to the optical axis, and the second reflector reflects light from the second light-emitting element near a major axis of the ellipse.

3. The lamp unit according to claim 1, wherein the second light-emitting element is arranged behind the first light-emitting element.

4. The lamp unit according to claim 1, wherein the reflecting face of the second reflector comprises a plurality of reflection regions in which second focal points of ellipses constituting the vertical cross-sectional shape of the respective reflection regions are arranged in different positions, and the additional projection lens comprises a plurality of lens parts whose rear focal points are arranged near the second focal points of the ellipses constituting the vertical cross-sectional shapes of the reflection regions.

5. The lamp unit according to claim 4, wherein, in the plurality of reflection regions, the farther apart one of the reflection regions is arranged from the second light-emitting element, the closer in proximity the second focal point of an ellipse constituting the vertical cross-sectional shape of the reflection region is arranged to the optical axis.

6. The lamp unit according to claim 5, wherein the straight advancement interrupting member comprises a mirror member including an upward reflecting face extending substantially in parallel with the optical axis rearward from a neighborhood of the rear focal point of the projection lens, and the mirror member includes an aperture for transmitting a part of the reflected light from the second reflector toward the upper lens part.

7. The lamp unit according to claim 4, wherein the plurality of lens parts includes a lower lens part positioned below the optical axis and an upper lens part positioned above the optical axis.

8. The lamp unit according to claim 1, wherein the additional projection lens comprises an annular lens surrounding the projection lens.

* * * * *